United States Patent Office 3,483,209
Patented Dec. 9, 1969

3,483,209

ARALKYLAMINES

Renat Herbert Mizzoni, Long Valley, N.J., assignor to Ciba Corporation, New York, N.Y., a corporation of Delaware No Drawing. Continuation-in-part of application Ser. No. 593,661, Nov. 14, 1966, which is a continuation-in-part of application Ser. No. 529,198, Feb. 23, 1966. This application May 2, 1967, Ser. No. 635,367
Int. Cl. C07c *93/14;* C07d *27/24;* A61k *27/50*
U.S. Cl. 260—294.7 10 Claims

ABSTRACT OF THE DISCLOSURE

Aralkylamines of the formula

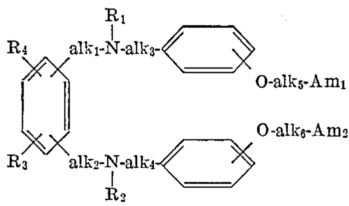

$alk_{1-6}$=lower alkylene or alkylene
$R_{1,2}$=H or lower alkyl
$R_{3,4}$=H, alkyl, alkoxy, alkylmercapto, halogeno, $CF_3$, $NO_2$ or an amino group
$Am_{1,2}$=an amino group N-oxides, quaternaries and salts thereof exhibit hypotensive and antiparasitic effects.

CROSS-REFERENCES TO RELATED APPLICATIONS

This is a continuation-in-part of application Ser. No. 593,661, filed Nov. 14, 1966, now abandoned which in turn is a continuation-in-part of application Ser. No. 529,-198, filed Feb. 23, 1966, now abandoned.

SUMMARY OF THE INVENTION

The present invention concerns and has for its object the provision of new bis-(basically etherified hydroxy-phenylmonoaza-aliphatyl)-benzenes, more particularly those of the Formula I

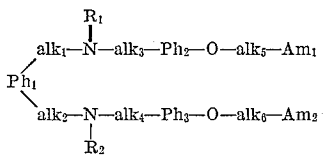

in which each of $Ph_1$, $Ph_2$ and $Ph_3$ stands for a phenylene radical, each of $alk_1$ to $alk_6$ for lower alkylene or alkenylene, $alk_5$ and $alk_6$ of which separating Am from the oxygen atom by at least 2 carbon atoms, each of $R_1$ and $R_2$ for hydrogen or lower alkyl and each of $Am_1$ and $Am_2$ for an amino group, N-oxides and quaternaries thereof and salts of these compounds as well as corresponding pharmaceutical compositions and methods for the preparation of the new compounds. Said compositions are useful as antibacterial and antiparasitic agents, for example, in the treatment of tuberculosis, Chagas' disease or tapeworm infestations, and/or as hypotensives.

DESCRIPTION OF THE PREFERRED EMBODIMENTS

Of the phenylene radicals, $Ph_1$ preferably stands for a 1,3-phenylene radical, whereas $Ph_2$ and $Ph_3$ preferably stand for a 1,4-phenylene radical. They may be unsubstituted or substituted by one or more than one of the same or different substituents attached to any of the positions available for substitution. Such substituents are, for example, lower alkyl, i.e. such with 1 to 7 carbon atoms, such as methyl, ethyl, n- or i-propyl or -butyl, etherified or esterified hydroxy or mercapto, for example, lower alkoxy or alkylmercapto, such as methoxy, ethoxy, n- or i-propoxy or n-butoxy, methyl or ethylmercapto, or halogeno, such as fluoro, chloro or bromo, trifluoromethyl, nitro or amino, such as di-lower alkylamino, e.g. dimethylamino or diethylamino.

A lower alkylene radical $alk_1$ to $alk_6$ is, for example, methylene, 1,1- or 1,2-ethylene, 1,1-, 1,2-, 2,2- or 1,3-propylene, 1,1-, 1,2-, 2,2-, 1,3- or 1,4-butylene, 2-methyl-1,3-propylene, 2,3-, 2,4- or 1,5-pentylene, 1,4-, 2,4- or 1,6-hexylene or 2,6-heptylene. An alkenylene radical $alk_1$ to $alk_6$ is, for example, 1,3-prop-1-enylene, 2-methyl-1,3-prop-1-enylene, 1,3- or 1,4-but-1-enylene, 1,4-but-2-enylene or 2,4-pent-2-enylene, the double bond of which preferably extends from the carbon atom linked with the phenylene radical or oxygen atom respectively.

An alkyl radical $R_1$ and $R_2$ is, for example, such mentioned as a Ph substituent. $R_1$ and $R_2$, however, stand preferably for a hydrogen atom.

An amino group $Am_1$ and $Am_2$ is preferably a tertiary amino group, such as di-lower alkylamino, mono- or bicyclic lower alkyleneimino (or N-aza-cycloalkyl or -bicycloalkyl respectively), monocyclic, monoaza,-oxa- or thiaalkyleneimino, e.g. dimethylamino, methylethylamino, diethylamino, di-n- or i-propylamino or di-n-butylamino; ethyleneimino, pyrrolidino, piperidino, 1,4-pentyleneimino, 2,5- or 1,6-hexyleneimino or 2,6-heptyleneimino; 2-aza-2-bicyclo[2,2,1]heptyl, 2-aza-2--2-bicyclo[2,2,2] or [3,2,1] octyl, 3-aza-3-bicyclo[3,2,1] or [3,3,0]octyl, 2-aza-2-bicyclo[3,2,2] or [3,3,1]nonyl, 3-aza-3-bicyclo[3,2,2] or [3,3,1]nonyl, 2-aza-2, 3-axa-3-, 7-aza-7- or 8-aza-8-bicyclo [4,3,0]nonyl or 2-aza-2- or 3-aza-3-bicyclo[4,4,0]decyl; piperazino, N-lower alkyl-piperazino, 3-aza-1,6-hexyleneimino, 3-lower alkyl-3-aza-1,6-hexyleneimino, 4-aza-1,7-heptyleneimino or 4-lower alkyl-4-aza-1,7-heptyleneimino, morpholino, 3,5-dimethyl-morpholino or thiamorpholino. One of the alkyls in a di-lower alkylamino group $Am_1$ and $Am_2$ may also be connected with the lower alkylene chains $alk_5$ or $alk_6$, to form preferably a 5- or 6-membered ring; accordingly $Am_1$ and $Am_2$ also represent n-lower alkyl-monoaza-cycloalkyl.

The compounds of the invention exhibit valuable pharmacological properties. Apart from hypotensive effects, they show primarily antibacterial and antiparasitic effects, for example, such against mycobacteria, trypanosoma and helmniths, such as *M. tuberculosis, Trypanosoma cruzi* or tapeworms, e.g. *Hymenolepis nana,* as can be demonstrated in in vitro or animal tests using mammals, for example mice or dogs, as test objects. Besides their above-mentioned utility, they are also valuable intermediates in the preparation of other useful products, preferably of pharmacologically active compounds.

Preferred are those compounds of Formula I in which each of $Ph_1$, $Ph_2$ and $Ph_3$ stands for phenylene, (lower alkyl)-phenylene, (lower alkoxy)-phenylene, (lower alkylmercapto)-phenylene, (halogeno)-phenylene, (trifluoromethyl)-phenylene, (nitro)-phenylene or (di-lower alkylamino)-phenylene, each of $alk_1$, $alk_2$, $alk_5$ and $alk_6$ for alkylene with up to 3 carbon atoms, the latter of which separating Am from the oxygen atom by at least 2 carbon atoms, each of $alk_3$ and $alk_4$ for alkylene with up to 3 carbon atoms or 1,3-prop-1-enylene being bound in 1-position with the phenylene radical, each of $Am_1$ and $Am_2$ for di-lower alkylamino, mono- or bicyclic lower alkyleneimino or monocyclic monoaza-, oxa- or thia-lower alkyleneimino, or N-lower alkylmonoaza-cycloalkyl and each of $R_1$ and $R_2$ for hydrogen or lower alkyl, and acid addition salts thereof.

Particularly useful are compounds of the Formula II

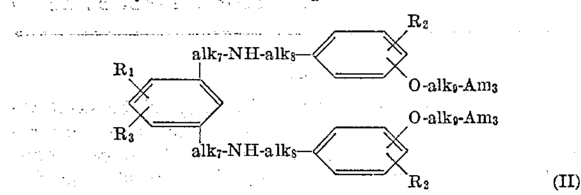

in which each of $R_1$, $R_2$ and $R_3$ stands for hydrogen, lower alkyl, lower alkoxy, lower alkylmercapto, halogen, trifluoromethyl, nitro or di-lower alkylamino, each of $alk_7$ and $alk_9$ for alkylene with up to 3 carbon atoms, the latter of which separates $Am_3$ from the oxygen atoms by at least 2 carbon atoms, $alk_8$ for alkylene with up to 3 carbon atoms or 1,3-prop-1-enylene being bound in 1-position with the phenylene radical, and $Am_3$ for dialkylamino, in which alkyl contains up to 3 carbon atoms, pyrrolidino, piperidino, N-methyl or ethyl-piperazino, morpholino or thia-morpholino, and acid addition salts thereof.

Compounds that are especially valuable are those of Formula III

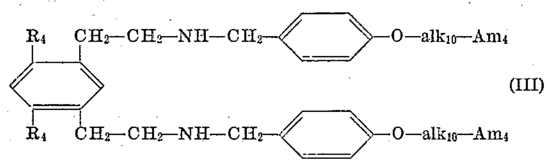

in which $R_4$ stands for hydrogen or methyl, $alk_{10}$ for 1,2-ethylene, 1,2- or 1,3-propylene and $Am_4$ for dimethylamino, diethylamino, pyrrolidino, piperidino or 1-methyl-4-piperidyl and therapeutically acceptable acid addition salts thereof, which, when given at a dose between 1 and 15 mg./kg./day into a loop of the small intestine of dogs, show outstanding hypotensive activity, or given at a dose between 10 and 50 mg./kg./day subcutaneously or intraperitoneally or between 20 and 100 mg./kg./day orally to mice, show outstanding activity against *Trypanosoma cruzi.*

The compounds of the invention are prepared according to methods in themselves known. For example, the process for the preparation consists in:

(a) reacting a bis-(X-alkyl or -alkenyl)-benzene with a basically etherified Y-alkyl or -alkenyl-phenol in which one of X and Y stands for a reactive esterified hydroxy group and the other for amino or monoalkylamino or,
(b) basically etherifying a bis-(hydroxyphenyl-monoaza-aliphatyl)-benzene or,
(c) reacting an amine with a reactive ester of a bis-(hydroxyalkoxy- or -alkenyloxyphenyl-monoazaaliphatyl)-benzene or,
(d) reducing in a bis-(basically etherified hydroxyphenyl-monoazaaliphatyl)-benzene, containing at least one carbamyl or methylideneimino group, said group to the methyleneamino group and, if desired converting any resulting compound into another compound of the invention.

A reactive ester of the alcohols used as starting material, is, for example, such derived from a hydrohalic acid, e.g. hydrochloric or hydrobromic acid, or a sulfonic acid, such as an alkane- or benzenesulfonic acid, e.g. methane-, ethane- or p-toluenesulfonic acid. Said reactive esters are advantageously reacted with the amines according to items (a) and (c) in the presence of bases, preferably alkali metal carbonates or bicarbonates or tertiary nitrogen bases, such as trialkylamines, N,N-dialkyl-anilines or pyridines. The phenolic starting material mentioned under item (b) is preferably used in the form of its alkali metal salt and reacted with a reactive ester of an amino-alkanol or -alkenol, e.g. those mentioned above.

The reduction according to item (d) is advantageously carried out with the use of complex light metal hydrides, such as alkali metal aluminum or borohydrides, e.g. lithium aluminum hydride or sodium borohydride, but also with the use of catalytically activated or nascent hydrogen, e.g. hydrogen in the presence of platinum or palladium catalysts or generated during electrolysis.

The compounds of the invention so obtained may be converted into each other by methods in themselves known. Thus, for example, a compound unsaturated in the aliphatic moiety may be hydrogenated with catalytically activated or nascent hydrogen. Primary, secondary or tertiary amines may be converted into tertiary amines or quaternaries respectively, for example, with the use of reactive esters of corresponding alcohols, preferably lower alkanols. The N-oxides of the invention are obtained, for example, by reacting the free bases with hydrogen peroxide or a peracid, e.g. peracetic, perbenzoic or monoperphthalic acid.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for examples, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts of the new compounds, for example, the picrates, can be used also for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly, those starting materials should be used in the reactions of the invention that lead to the formation of those compounds indicated above as being specially valuable.

The starting material used is known or, if new, may be prepared according to known methods. Thus, for example, that mentioned under item (a) may be prepared from the corresponding alcohols, by esterification, such as reaction with halogenating or sulfonating agents, e.g. thionyl chloride, phosphorus pentabromide or p-toluenesulfonyl chloride, and the amines, for example, by reduction of corresponding oximes or nitriles. The compounds mentioned under items (b) and (c) may be prepared analogous to to the reduction shown under (d) using the corresponding amides or Schiff's bases respectively. The compounds mentioned under item (d) can be prepared by reaction of the corresponding reactive acid derivatives, e.g. halides or anhydrides, or the aldehydes, with the appropriate amines.

Starting materials or final products that are mixtures of isomers may be separated into simple isomers by methods in themselves known. For example, compounds that contain one or more asymmetrical carbon atoms may be in the form of racemate mixtures, pure racemates or optical antipodes. Mixtures of racemates, by virtue of the physicochemical differences between the components, can be resolved into the stereoisomeric pure racemates (diastereoisomers), for example, by chromatography and/or fractional crystallization. Racemic products can likewise be resolved into the optical antipodes, for example, by reaction with optically active acids, separation of the diastereomeric salts and liberation of the bases from the salts.

The compounds of the invention can be used, for example, for the manufacture of pharmaceutical compositions containing them in conjunction or admixture with inorganic or organic, solid or liquid pharmaceutical excipients, suitable for enteral, parenteral or topical administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions, are prepared by conventional methods and contain about 0.1 to 75%, more particularly 1 to 50% of the active ingredient.

The following examples illustrate the invention and are not to be construed as being limitations thereon. Temperatures are given in centigrade, and all parts wherever given are parts by weight.

EXAMPLE 1

The solution containing 2.50 g. 1,3-bis-aminomethyl-benzene and 7.89 g. 4-(2-pyrrolidino-ethoxy)-benzaldehyde in 50 ml. methanol is allowed to stand overnight at room temperature. Hereupon to the stirred mixture 2.2 g. sodium borohydride are added portionwise and after standing overnight it is evaporated in vacuo. The residue is taken up in water, the mixture extracted with diethyl ether, the extract dried, filtered and dry hydrogen chloride is bubbled through. The precipitate formed is filtered off and recrystallized from isopropanol-diethyl ether to yield the hygroscopic 1,3 - bis - {3 - [4 - (2-pyrrolidino - ethoxy)-phenyl]-2-azapropyl}-benzene tetrahydrochloride of the formula

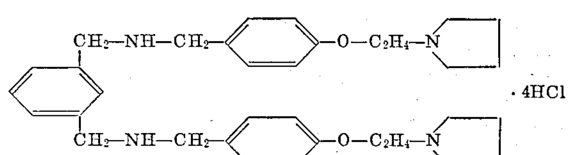

melting at 148–149° with decomposition.

The starting material is prepared as follows: 2.3 g. sodium are reacted with 100 ml. anhydrous ethanol and to the solution 12.21 g. 4-hydroxy-benzaldehyde are added portionwise while stirring. After dissolution 14.7 g. 2-pyrrolidino-ethyl chloride in 30 ml. benzene are added during 15 minutes, the mixture is refluxed for 6 hours and allowed to stand overnight at room temperature. It is then filtered, the filtrate evaporated, the residue distilled and the fraction boiling at 208–210°/25 mg. Hg collected; it represents the 4-(2-pyrrolidino-ethoxy)-benzaldehyde, its hydrochloride melts at 190° with decomposition.

The 1,3-bis-aminomethyl-benzene is obtained by reduction of the bisoxime of isophthalaldehyde with hydrogen in acetic acid and in the presence of platinum oxide.

EXAMPLE 2

In the analogous manner described in Example 1, the 1,3-bis-{3-[4-(2-dimethylamino - propoxy) - phenyl]-2-azapropyl}-benzene tetrahydrochloride of the formula

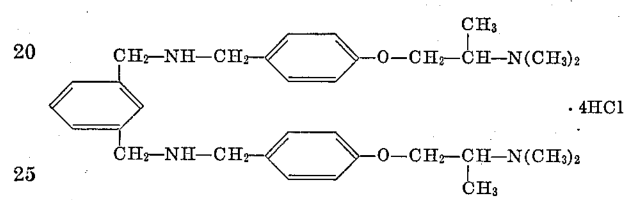

M.P. 151–153° (dec.) is prepared from 2.5 b. 1,5-bis-aminomethyl-benzene, 7.46 g. 4-(2-dimethylamino - propoxy)-benzaldehyde (B.P. 170–172°/15 mm. Hg) and 2.2 g. sodium borohydride.

EXAMPLE 3

The mixture of 8.33 g. 1,3-bis-(2-amino-ethyl)-benzene, 23.0 g. 4-(2-pyrrolidino - ethoxy) - acetophenone, 250 ml. toluene and 0.1 g. p-toluenesulfonic acid is refluxed for 20 hours on a water trap during which time the theoretical amount of water is separated. Hereupon it is evaporated in vacuo, the residue dissolved in 100 ml. methanol and to the stirred solution 6.0 g. sodium borohydride are added portionwise at room temperature. After standing overnight it is evaporated, to the residue 10 ml. water and 10 ml. 50% aqueous sodium hydroxide are added and the mixture is extracted twice with 100 ml. methylene chloride. The extract is dried, evaporated, the residue taken up in 300 ml. diethyl ether and the solution gassed with anhydrous hydrogen chloride. The solid formed is filtered off and recrystallized from ethanol-diethyl ether to yield the 1,3-bis{4-[4-(2-pyrrolidino-ethoxy)-phenyl]-3-azapentyl}-benzene tetrahydrochloride of the formula

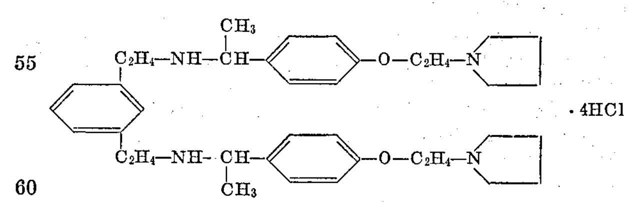

melting at 164–166° with decomposition.

The starting material is prepared as follows: The solution of 27.2 g. 4-hydroxy-acetophenone in 150 ml. dry ethanol is added during 15 minutes to the solution prepared from 4.6 g. sodium and 200 ml. dry ethanol at room temperature while stirring. Hereupon the solution of 29.4 g. 2-pyrrolidino-ethyl chloride in 60 ml. benzene is added, the mixture refluxed for 3 hours, cooled, filtered and the residue washed with hot ethanol. The filtrate is evaporated, the residue distilled and the fraction boiling at 199–200°/15 mm. Hg collected; it is redistilled and collected at 136–140°/0.15 mm. Hg and represents the desired 4-(2-pyrrolidino-ethoxy)-acetophenone.

EXAMPLE 4

Analogous to the method shown in Example 1, the following compounds are prepared from equivalent amounts of the corresponding starting material:

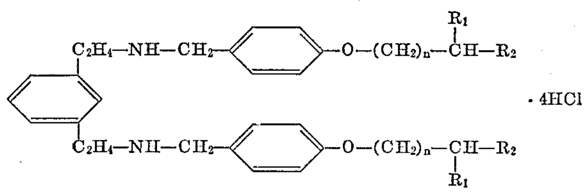

| n | $R_1$ | $R_2$ | M.P. | Corresp. aldehyde B.P. |
|---|---|---|---|---|
| 1 | H | pyrrolidino | 234–235° | 208–210°/25 mm. |
| 1 | H | piperidino | 213–215° (dec) | 218–220.5°/25 mm. |
| 1 | H | $N(CH_3)_2$ | 252–253° (dec.) | 121–124°/0.75 mm. |
| 1 | H | $N(C_2H_5)_2$ | 195° (dec.) | Commercial product. |
| 2 | H | $N(CH_3)_2$ | 242° (dec.) | 185–187°/15 mm. |
| 2 | H | $N(C_2H_5)_2$ | 181–182° (dec.) | 179–180°/22 mm. |
| 1 | $CH_3$ | $N(CH_3)_2$ | 178–180° | 170–172°/15 mm. |

EXAMPLE 5

The solution of 5.0 g. 1,3-bis-(2-amino-ethyl)-benzene and 12.4 g. 3-(2-dimethylamino-propoxy)-benzaldehyde in 50 ml. methanol is allowed to stand overnight at room temperature. Hereupon it is stirred, 3.6 g. sodium borohydride are added portionwise and after standing overnight it is evaporated. The residue is taken up in water, the mixture extracted with diethyl ether, the extract dried, filtered and gassed with dry hydrogen chloride. The precipitate formed is filtered off and recrystallized from isopropanol-diethyl ether to yield the 1,3-bis-{4-[3-(2-dimethylamino-propoxy)-phenyl]-3-azabutyl}-benzene tetrahydrochloride of the formula

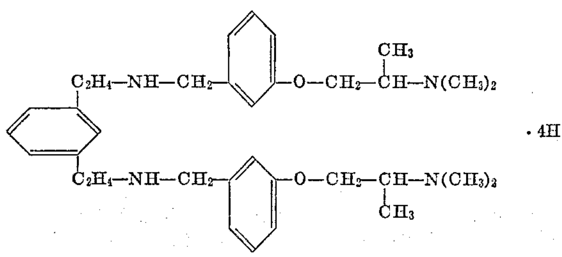

melting at 128–130°.

The analogously prepared 1,3-bis-{4-[3-(3-dimethylamino-propoxy)-phenyl]-3-azabutyl}-benzene tetrahydrochloride melts at 202° with decomposition.

Of the starting aldehydes the 3-(2-dimethylamino-propoxy)-benzaldehyde boils at 161–163°/15 mm. and the 3-(3-dimethylamino-propoxy)-benzaldehyde at 168–168.5°/15 mm.

EXAMPLE 6

The mixture of 5.0 g. 1,3-bis-(2-amino-ethyl)-benzene, 14.23 g. 3-methoxy-4-(2-dimethylamino-propoxy)-benzaldehyde and 50 ml. methanol is allowed to stand at room temperature overnight. Hereupon 3.6 g. sodium borohydride are added while stirring and the mixture is kept again overnight. It is then evaporated in vacuo, the residue triturated with water and extracted with diethyl ether. The extract is dried, filtered and gassed with dry hydrogen chloride. The precipitate formed is filtered off and recrystallized from isopropanol-diethyl ether to yield the 1,3 - bis - {4-[3-methoxy-4-(2-dimethylamino - propoxy)-phenyl]-3-azabutyl}-benzene tetrahydrochloride of the formula

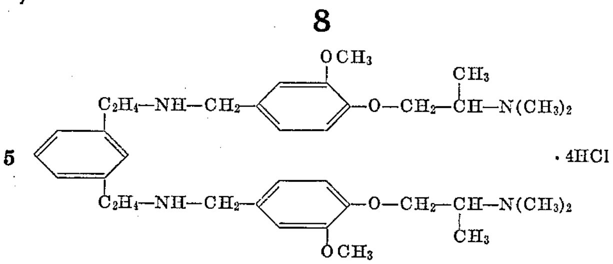

melting at 145–147° with decomposition.

The starting material is prepared as follows: To the solution of 73.0 g. vanillin in 100 ml. dimethylformamide, 26.9 g. of a 56% suspension of sodium hydride in mineral oil are added while stirring and the mixture is allowed to stand overnight. Hereupon it is heated to reflux and after cooling to room temperature the solution of 73.0 g. 2-dimethylamino-propyl chloride in 150 ml. toluene is added dropwise while stirring. The mixture is stirred for 4 hours at room temperature and allowed to stand overnight. Hereupon it is warm filtered, the filtrate evaporated in vacuo, the residue combined with 100 ml. water and extracted with diethyl ether. The extract is shaken with 3 N hydrochloric acid, the aqueous solution made alkaline with aqueous sodium hydroxide and extracted with diethyl ether. The extract is dried, filtered and evaporated, the residue distilled and the fraction boiling at 129–131°/0.25 mm. Hg collected; it represents the 3-methoxy-4-(2-dimethylamino-propoxy)-benzaldehyde.

EXAMPLE 7

20.0 g. 1,3-bis-{4-[4-(3-diethylamino-propoxy)-phenyl]-3-azabutyl}-benzene tetrahydrochloride are dissolved in 100 ml. water and the solution made basic with aqueous sodium hydroxide. It is extracted with diethyl ether, the extract dried, evaporated and the residue dissolved in 50 ml. isopropanol. 5.34 g. maleic acid in the minimal amount of hot isopropanol necessary for dissolution, are added and the mixture is kept in the refrigerator for 3 days. The supernatant solution is decanted off, the residue triturated with diethyl ether and the remaining amorphous 1,3 - bis-{4-[4-(3-diethylamino-propoxy)-phenyl]-3-azabutyl}-benzene dimaleate monohydrate dried in vacuo; it analyzes as follows:

Theory: C, 64.77%; H, 8.03%; N, 6.57%. Found: C, 64.36%; H, 8.09%; N, 6.12%.

EXAMPLE 8

According to the method shown in the previous examples the following compounds are prepared from the equivalent amount of the corresponding starting material: 1,2 - bis - {4 - [3-(2-pyrrolidino-ethoxy)-phenyl]-3-azabutyl}-benzene tetrahydrochloride, 1,4-bis-{3-[4-(2-dimethylamino - propoxy) - phenyl]-2-azapropyl}-benzene, 1,3 - bis-{6-[4-(2-morpholino-ethoxy) - phenyl]-3-azahex-5-enyl}-5-methoxy-benzene, 1,3-bis-{5-[3-(2-thiamorpholino - propoxy) - 5-chloro-phenyl]-2-azapent-4-enyl}-benzene, 1,4 - bis-{5-[4-(4-dimethylamino-butoxy-phenyl]-4-azapent-1-enyl}-benzene and 1,3-bis-{5-[3-(2-N-methyl-piperazino - ethoxy) - 5-methyl-phenyl]-4-azahex-1-enyl}-5-chloro-benzene, the tetrahydrochlorides and dimaleates thereof.

EXAMPLE 9

The solution of 3.44 g. 1,3-bis-(2-aminoethyl)-4,6-dimethyl-benzene and 8.88 g. 4-[3-(1-methyl-4-piperidyl)-propoxy]-benzaldehyde in 100 ml. methanol is allowed to stand overnight at room temperature. Hereupon 3.6 g. sodium borohydride are added portionwise while stirring and the mixture is again allowed to stand overnight. It is then evaporated in vacuo, the residue suspended in 100 ml. water and the suspension extracted with diethyl ether. The extract is dried, filtered, gassed with anhydrous hydrogen chloride, the precipitate filtered off and recrystallized from methanol-diethyl ether to yield the 1,3-bis-{4-[4 - (3 - N - methyl-4-piperidyl-propoxy)-phenyl]-3-azabutyl}-4,6-dimethyl-benzene tetrahydrochloride of the formula

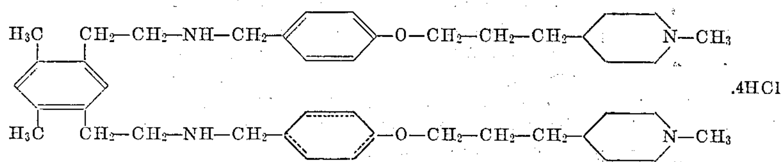

melting at 151–153° with decomposition.

The starting material is prepared as follows: To the solution of 68.6 g. 4-(3-hydroxy-propyl)-pyridine in 500 ml. benzene, 34 ml. methyl iodide are added dropwise while stirring and the mixture is stirred and refluxed overnight. Hereupon it is evaporated in vacuo and the residue recrystallized from isopropanol to yield the 1-methyl-4-(3-hydroxy-propyl)-pyridinium iodide melting at 73–75°.

25 g. thereof are hydrogenated in 100 ml. anhydrous ethanol over 2.5 g. platinum oxide at 3 atmospheres until the theoretical amount of hydrogen is absorbed. The mixture is filtered, the filtrate evaporated in vacuo, the residue treated with charcoal and recrystallized from isopropanol to yield the 3-(1-methyl-4-piperidyl)-propanol hydroiodide melting at 51°. It is dissolved in the minimum amount of water, the solution made basic with aqueous sodium hydroxide, extracted with chloroform and the dried extract evaporated, to yield the corresponding base.

To the chilled solution of 41.5 g. thereof in 150 ml. chloroform, 20.8 ml. thionyl chloride are added dropwise during 1 hour while stirring and the mixture is stirred overnight at room temperature. Hereupon about 6 ml. methanol are added and the mixture evaporated in vacuo. The residue is recrystallized from isopropanol to yield the 3-(1-methyl-4-piperidyl)-propyl chloride hydrochloride melting at 126–127°; its base is liberated with $NaHCO_3$.

The solution of 38.5 g. thereof in 75 ml. toluene is added to the stirred mixture prepared from 21.5 g. 4-hydroxy-benzaldehyde, 50 ml. dimethyl formamide and 7.53 g. of a 56% suspension of sodium hydride in mineral oil. The mixture is stirred for 5 hours at room temperature and allowed to stand overnight. It is filtered warm, the filtrate evaporated in vacuo, the residue taken up in water and extracted with diethyl ether. The extract is shaken with 3 N-hydrochloric acid, the aqueous layer made alkaline with sodium hydroxide and extracted with diethyl ether. The extract is dried, filtered, evaporated, the residue distilled and the fraction boiling at 238°/15 mm. Hg collected; it represents the 4-[3-(1-methyl-4-piperidyl)-propoxy]-benzaldehyde.

The mixture of 75.0 g. 1,3-bis-chloromethyl-4,6-dimethyl-benzene, 54.6 g. potassium cyanide, 365 ml. 95% ethanol and 500 ml. dimethyl sulfoxide is refluxed for 10 hours while stirring and allowed to stand overnight at room temperature. It is poured into 3 liters water, the precipitate formed filtered off, washed with water, and recrystallized from isopropanol, to yield the 1,3-bis-cyanomethyl-4,6-dimethyl-benzene melting at 87–88°.

To the suspension of 15.0 g. thereof and a teaspoon of Raney-nickel in 100 ml. anhydrous ethanol, 25 ml. liquid ammonia are added while chilling with dry ice. The mixture is hydrogenated at 6.4 atmospheres until the theoretical amount of hydrogen is absorbed. It is then filtered, the filtrate evaporated, the residue distilled and the fraction boiling at 118°/0.4 mm. Hg collected; it represents the 1,3,bis-(2-amino-ethyl) - 4,6 - dimethylbenzene.

EXAMPLE 10

The solution of 5.77 g. 1,3-bis-(2-aminoethyl)-4,6-dimethyl-benzene and 13.15 g. of 4-(2-pyrrolidino-ethoxy)-benzaldehyde in 100 ml. methanol is allowed to stand overnight at room temperature. Hereupon 3.6 g. sodium borohydride are added portionwise while stirring and the mixture is again left to stand overnight. It is evaporated in vacuo, the residue taken up in water, the mixture extracted with diethyl ether, the extract dried, filtered and the filtrate gassed with dry hydrogen chloride. The precipitate formed off and recrystallized from isopropanol to yield the 1,3-{4-[4-(2-pyrrolidino-ethoxy)-phenyl] - 3 - azabutyl} - 4,6 - dimethyl - benzene tetrahydrochloride of the formula

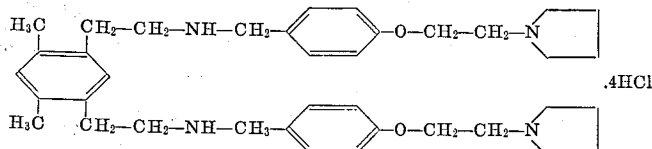

melting at 155° with decomposition.

EXAMPLE 11

The mixture of 5.0 g. 1,3-bis-(2-aminoethyl)-benzene, 16.4 g. 4-[2-(3-aza-3-bicyclo[3,2,2]nonyl)-ethoxy]-benzaldehyde and 200 ml. methanol is stirred for 15 minutes at room temperature. Hereupon 3.6 g. sodium borohydride are added portionwise and the mixture stirred overnight at room temperature. It is then evaporated in vacuo, to the residue 100 ml. water are added, the mixture extracted with diethyl ether, the extract dried, filtered and the filtrate gassed with anhydrous hydrogen chloride. The mixture is allowed to stand overnight in the refrigerator, it is then filtered and the residue recrystallized from methanol-diethyl ether to yield the 1,3-bis-{4-{4-[2 - (3 - aza - 3 - bicyclo[3,2,2]nonyl) - ethoxy]-phenyl}-3-azabutyl}-benzene tetrahydrochloride monohydrate of the formula

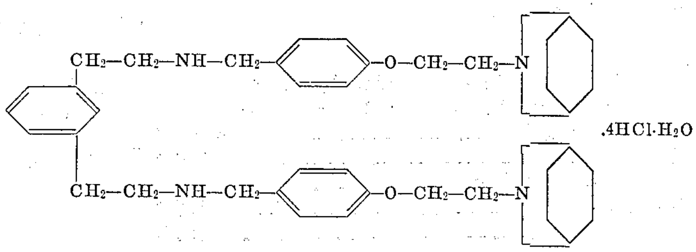

melting at 235–237° with decomposition.

The starting material is prepared as follows: To the solution of 90.5 g. 3-aza-bicyclo[3,2,2]nonane in 600 ml. benzene, 45 g. ethylene bromohydrin in 125 ml. benzene are added dropwise during 1¼ hour while stirring.

The mixture is then refluxed for 1 hour, filtered, the filtrate evaporated, the residue distilled and the fraction boiling at 100–102°/2.2 mm. Hg collected; it represents the 2-(3-aza-3-bicyclo[3,2,2]nonyl)-ethanol.

48.0 g. thereof are dissolved in 150 ml. chloroform and the solution chilled in an ice-salt bath. 22.5 ml. thionyl chloride are added dropwise and the mixture is allowed to stand at room temperature overnight. Hereupon 6.7 ml. methanol are added, the mixture evaporated in vacuo, and the residue recrystallized from isopropanol-methanol to yield the 2-(3-aza-3-bicyclo[3,2,2]nonyl)-ethyl chloride hydrochloride melting above 250°. It is taken up in chloroform, the mixture shaken with aqueous sodium bicarbonate, dried and evaporated to yield the corresponding base.

The solution of 32.0 g. thereof in 50 ml. toluene is added dropwise during 1 hour to the stirred mixture of 18.3 g. of a 56% suspension of sodium hydride in mineral oil, kept under nitrogen. The mixture is stirred for 3 hours at room temperature and allowed to stand overnight. It is then filtered, the residue washed with hot benzene, the filtrate evaporated in vacuo, the residue suspended in 100 ml. water and the suspension extracted with diethyl ether. The extract is shaken with 3 N-hydrochloric acid, the aqueous layer made basic with sodium hydroxide and extracted with diethyl ether. The extract is dried, filtered, the residue distilled and the fraction boiling at 177–178°/0.5 mm. Hg collected; it represents the 4-[2-(3-aza-3-bicyclo[3,2,2]-nonyl)-ethoxy]-benzaldehyde.

EXAMPLE 12

Analogous to the method shown in the previous examples, the following compounds are prepared from equivalent amounts of the corresponding starting materials:

(a) 1,3 - bis - {4 - [4 - (3 - pyrrolidino - propoxy)-phenyl]-3-azabutyl}-benzene tetrahydrochloride dihydrate melting at 222–224°. with decomposition.

(b) 1,3 - bis - {4 - {4 - [3 - (1 - methyl - 4 - piperidyl)-propoxy]-phenyl} - 3 - azabutyl}-benzene tetrahydrochloride melting at 232–234° with decomposition, (c) 1,2 - bis - {3 - [4 - (2 - pyrrolidino - ethoxy)-phenyl]-2-azapropyl}-benzene tetrahydrochloride melting at 235–237° with decomposition, and (d) 1,2 - bis - {3 - [4 - (3 - dimethylamino - propoxy)-phenyl]-2-azapropyl}-benzene tetrahydrochloride hemihydrate melting at 175° with decomposition. The starting material of the latter two compounds is obtained by hydrogenation of phthalaldehyde bisoxime in acetic acid over platinum oxide.

EXAMPLE 13

The compounds described hereinbefore may be used as the active ingredient of the following pharmaceutical compositions containing the active compounds, preferably in the range between about 50 and 250 mg. per oral dosage unit. Such dosage units may be applied up to 3 times a day.

Preparation of 20,000 tablets each containing 200 mg. of the active ingredient.

| Formula: | G. |
|---|---|
| 1,3 - bis - {4 - [4 - (2 - dimethylamino-ethoxy)-phenyl]-3-azabutyl}-benzene tetrahydrochloride | 4,000.0 |
| Gelatin | 150.0 |
| Corn starch (anhydrous) | 1,659.0 |
| Talcum | 625.0 |
| Stearic acid | 66.0 |
| Purified water, q.s. | |

Procedure

The tetrahydrochloride and 726 g. of the starch are passed through a screen with 1 mm. openings and mixed thoroughly. The gelatin is dissolved in 2000 ml. water, the solution combined with a suspension of 308 g. starch in 400 ml. cold water and the whole heated on a water bath until a paste is formed. It is combined with the sieved powders using additional water, if necessary. The granulate is passed through a screen with 4 mm. openings, dried at 49° and broken on a screen with 2 mm. openings in a comminuting machine (knives forward). The granules are mixed with the talcum, stearic acid and the remaining starch and the mixture compressed into tablets using standard concave punches scored and monogrammed.

Preparation of 1000 tablets each containing 50 mg. of the active ingredient.

| Formula: | G. |
|---|---|
| 1,3 - {4 - [4 - (2 - pyrrolidino-ethoxy)-phenyl]-3-azabutyl}-benzene tetrahydrochloride | 50.0 |
| Colloidal silica | 2.5 |
| Corn starch | 7.5 |
| Magnesium stearate | 1.0 |
| Lactose | 89.0 |
| Ethanol (anhydrous), q.s. | |
| Purified water, q.s. | |

Procedure

The lactose and the tetrahydrochloride are passed through a comminuting machine using a screen with 1.2 mm. openings. The stearate, starch and silica, previously mixed with a small portion of the lactose, are added to the sieved powders, which are mixed at low speed for 30 minutes. They are then granulated with ethanol-water (1:1) until suitable granules are formed. The granulate is passed through a comminuting machine (knives forward) using a screen with 4.0 mm. openings. The granulate is dried at 49° to a moisture content below 2%, again passed through a comminuting machine (knives forward) using a screen with 1.4 mm. openings and compressed into 150 mg. tablets using 9/32" standard concave punches.

EXAMPLE 14

The mixture of 10.0 g. 1,4-bis-(2-amino-ethyl)-benzene 26.6 g. 4-(2-diethylamino-ethoxy)-benzaldehyde and 100 ml. methanol is allowed to stand at room temperature for 18 hours. Hereupon 7.2 g. sodium borohydride are added portionwise while stirring. After standing overnight 100 ml. water are added followed by 20 ml. 50% aqueous sodium hydroxide. The mixture is extracted with diethyl ether, the extract dried, filtered and the filtrate acidified with dry hydrogen chloride. The precipitate formed is filtered off and recrystallized from methanol-diethyl ether to yield the 1,4-bis-{4-[4-(2-diethylamino-ethoxy)-phenyl]-3-azabutyl}-benzene tetrahydrochloride of the formula

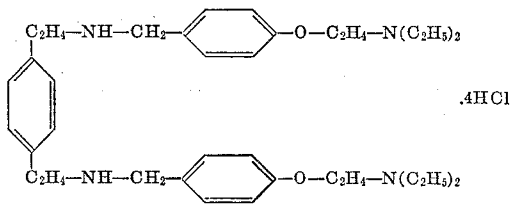

melting at 297° with decomposition.

What is claimed is:

1. A symmetrical bis-(basically etherified hydroxy-phenyl-monoaza-aliphatyl)-benzene having the formula

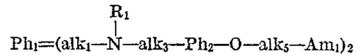

in which $Ph_1$ is 1,2-phenylene, 1,3-phenylene or 1,4-phenylene which is unsubstituted or substituted by at most 2 members selected from the group consisting of lower alkyl, $Ph_2$ is 1,3-phenylene or 1,4-phenylene which is unsubstituted each of $alk_1$, $alk_3$ and $alk_5$ is alkylene with up to 3 carbon atoms, $alk_5$ separating Am from the oxygen atom by at least 2 carbon atoms, [each of $alk_3$ and $alk_4$ for a member selected from the group consisting of alkylene with up to 3 carbon atoms and 1,3-prop-1-enylene being bound in 1-position with phenylene, each of] $Am_1$ is a member selected from the group consisting of di-lower alkylamino, pyrrolidino, piperidino, 1-lower alkyl piperidyl and 3-aza-3-bicyclo-[3,2,2]nonyl and $R_1$ is a member selected from the group consisting of hydrogen and lower alkyl, and a therapeutically acceptable acid addition salt thereof.

2. A compound as claimed in claim 1 and having the formula

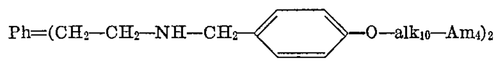

in which Ph is 1,3-phenylene or 4,6-dimethyl-1,3-phenylene, $alk_{10}$ is a member selected from the group consisting of 1,2-ethylene, 1,2-propylene and 1,3-propylene and $Am_4$ is a member selected from the group consisting of dimethylamino, diethylamino, pyrrolidino, piperidino and 1-methyl-4-piperidyl and a therapeutically acceptable acid addition salt thereof.

3. A compound as claimed in claim 1 and being a member selected from the group consisting of the 1,3-bis-[4-(4-R-phenyl)-3-azabutyl]-benzene, in which R stands for a member selected from the group consisting of 2-pyrrolidino-ethoxy, 2-piperidino - ethoxy, 2 - dimethylamino-ethoxy, 2-diethylamino-ethoxy, 3-dimethylamino-propoxy, 3-diethylamino-propoxy, 2-dimethylamino-propoxy, 2-(3-aza-3-bicyclo[3,2,2]nonyl)-ethoxy, 3-pyrrolidino-propoxy and 3-(1-methyl-4-piperidyl)-propoxy, and its tetrahydrochloride.

4. A compound as claimed in claim 1 and being a member selected from the group consisting of the 1,3-bis-[3-(4-R-phenyl)-2-azapropyl]-benzene in which R stands for a member selected from the group consisting of 2-pyrrolidino-ethoxy and 2-dimethylaminopropoxy, and its tetrahydrochloride.

5. A compound as claimed in claim 1 and being a member selected from the group consisting of the 1,3-bis{-4-[4-(2-pyrrolidino-ethoxy)-phenyl]-3-azapentyl-benzene} and its tetrahydrochloride.

6. A compound as claimed in claim 1 and being a member selected from the group consisting of the 1,3-bis-[4-(3-R-phenyl)-azabutyl]-benzene in which R stands for a member selected from the group consisting of 2-dimethylamino-propoxy and 3-dimethylamino-propoxy and its tetrahydrochloride.

7. A compound as claimed in claim 1 and being a member selected from the group consisting of the 1,3-bis-{-4(3-methoxy-4-(2-dimethylamino-propoxy)-phenyl] - 3 - azabutyl)-benzene, and its tetrahydrochloride.

8. A compound as claimed in claim 1 and being a member selected from the group consisting of 1,3-bis-[4-(4-R-phenyl)-3-azabutyl] - 4,6 - dimethyl - benzene, in which R stands for a member selected from the group consisting of 3-(1-methyl-piperidyl)-propoxy and 2-pyrrolidino-ethoxy, and its tetrahydrochloride.

9. A compound as claimed in claim 1 and being a member selected from the group consisting of 1,2-bis-[3-(4-R-phenyl)-2-azapropyl]-benzene in which R stands for a member selected from the group consisting of 2-pyrrolidino-ethoxy and 3-dimethylamino-propoxy and its tetrahydrochloride.

10. A compound as claimed in claim 1 and being a member selected from the group consisting of the 1,4-bis-{4-[4-(2-diethylamino-ethoxy)-phenyl]-3-azabutyl} - benzene and its tetrahydrochloride.

References Cited

UNITED STATES PATENTS 2,567,778 9/1951 Mattocks.

HENRY R. JILES, Primary Examiner

R. T. BOND, Assistant Examiner

U.S. Cl. X.R.

260—239, 243, 246, 268, 293.4, 326.5, 570.7; 424—244, 246, 248, 250, 267, 274, 330

CASE SU-464/1-3

PO-1050
(5/69)

UNITED STATES PATENT OFFICE
CERTIFICATE OF CORRECTION

Patent No. 3,483,209 Dated December 9, 1969

Inventor(s) RENAT HERBERT MIZZONI

It is certified that error appears in the above-identified patent and that said Letters Patent are hereby corrected as shown below:

Column 12, line 74, after "unsubstituted", insert --- , ---.

Column 13, lines 1 through 5, delete "[each of----of]".

SIGNED AND SEALED NOV 17 1970

(SEAL)
Attest:

Edward M. Fletcher, Jr.
Attesting Officer

WILLIAM E. SCHUYLER, JR.
Commissioner of Patents